Figure 1:
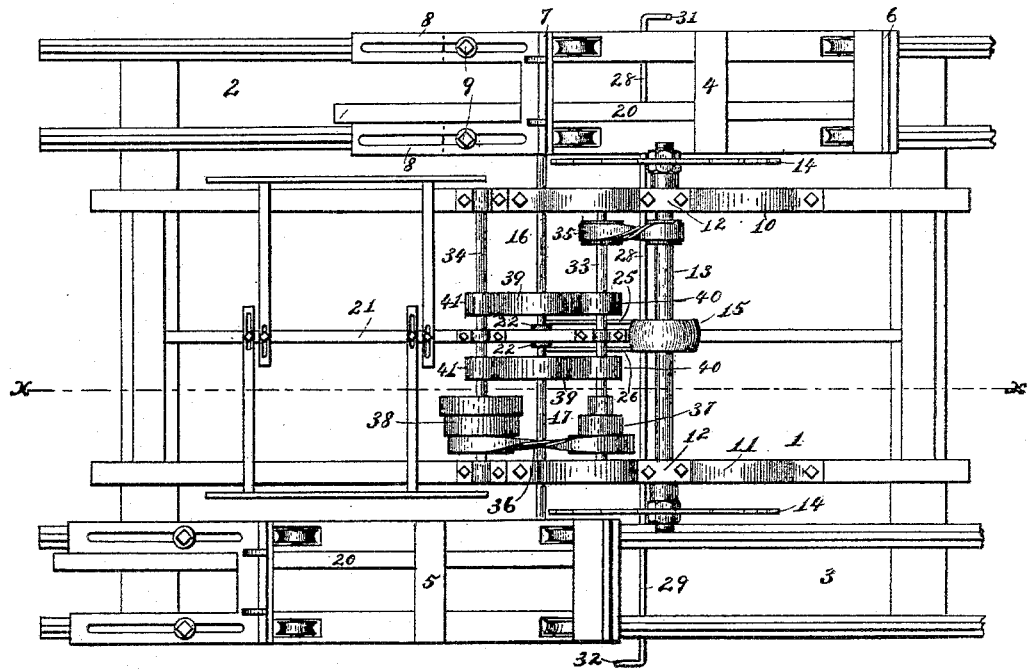

(No Model.)  2 Sheets—Sheet 1.

J. C. & B. A. LAKE.
PORTABLE CIRCULAR SAW MILL.

No. 412,101.  Patented Oct. 1, 1889.

WITNESSES:  INVENTOR (No Model.) 2 Sheets—Sheet 2.

J. C. & B. A. LAKE.
PORTABLE CIRCULAR SAW MILL.

No. 412,101. Patented Oct. 1, 1889.

WITNESSES:  INVENTOR

UNITED STATES PATENT OFFICE.

JOHN C. LAKE AND BERTUS A. LAKE, OF BIG PRAIRIE, OHIO.

PORTABLE CIRCULAR-SAW MILL.

SPECIFICATION forming part of Letters Patent No. 412,101, dated October 1, 1889.

Application filed May 25, 1889. Serial No. 312,100. (No model.)

*To all whom it may concern:*

Be it known that we, JOHN C. LAKE and BERTUS A. LAKE, citizens of the United States, residing at Big Prairie, in the county of Wayne and State of Ohio, have invented certain new and useful Improvements in Portable Circular-Saw Mills; and we do hereby declare the following to be a full, clear, and exact description of the invention, such as will enable others skilled in the art to which it appertains to make and use the same.

Our invention relates to improvements in portable circular-saw mills especially adapted for sawing pickets; and it has for its object, primarily, to increase the capacity for work of the mill, and thus economize time and utilize the full power of the steam-engine or motor used for running the mill, and which will permit either of the sawing mechanisms, which are driven by a common feed device, to be stopped and started at will, or to run the carriages in either direction and without interfering with one another.

With these ends in view and such others as appertain to our invention we provide a saw-mandrel which carries two rotary saws, two independent carriages arranged to travel on tracks on opposite sides of the supporting frame or arch in which the saw-mandrel is journaled, two independent feed-shafts each mounted in rocking bearings and independently controlled by a suitable shifting-lever to be thrown into or out of gear with one of the carriages, and a feed device driven from the saw-mandrel and adapted to independently or jointly rotate the feed shaft or shafts in either direction at will, in order to feed the carriages either backward or forward. This feed device consists of two shafts located on opposite sides of the feed-shafts, one shaft being belted to the saw-mandrel and to the other shaft of the feed device, so that the shafts of said device are rotated in opposite directions, and each shaft of the feed device is provided with two friction-disks, against which similar friction-disks on the feed-shafts are adapted to impinge when said feed-shafts are adjusted by the shifting-levers, so that the feed-shafts are driven by frictional contact with one or the other of the shafts of the feed device, as will be more fully hereinafter described.

Our invention further consists of a saw-mill carriage having a fixed vertical stop at one end and an adjustable stop at its opposite end for accommodating and holding logs of different length.

By the use of the two separate carriages adapted to be independently or jointly operated by the feed-shafts from a common feed device we are enabled to very materially increase the capacity for work of the saw-mill and to utilize very nearly, if not quite, the full power developed by the steam-engine or motor used for driving the mill, and also effect a very material saving in time and labor.

To enable others to more fully understand our invention, we will now proceed to a detailed description thereof, in connection with the accompanying drawings, in which—

Figure 2:
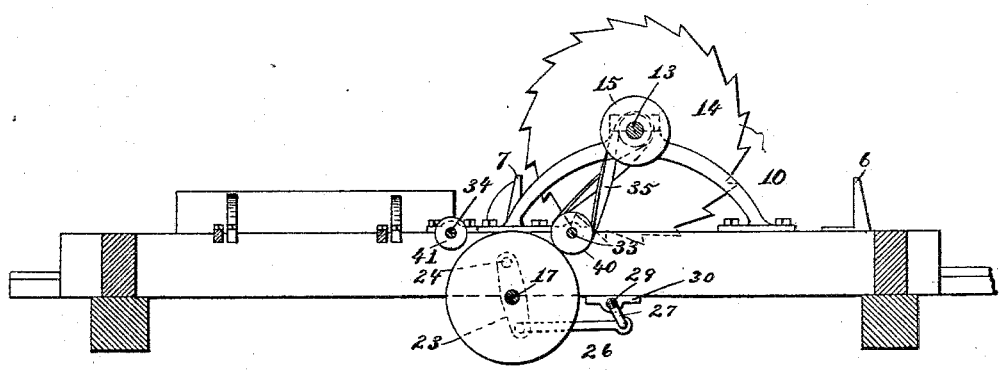
Figure 3:
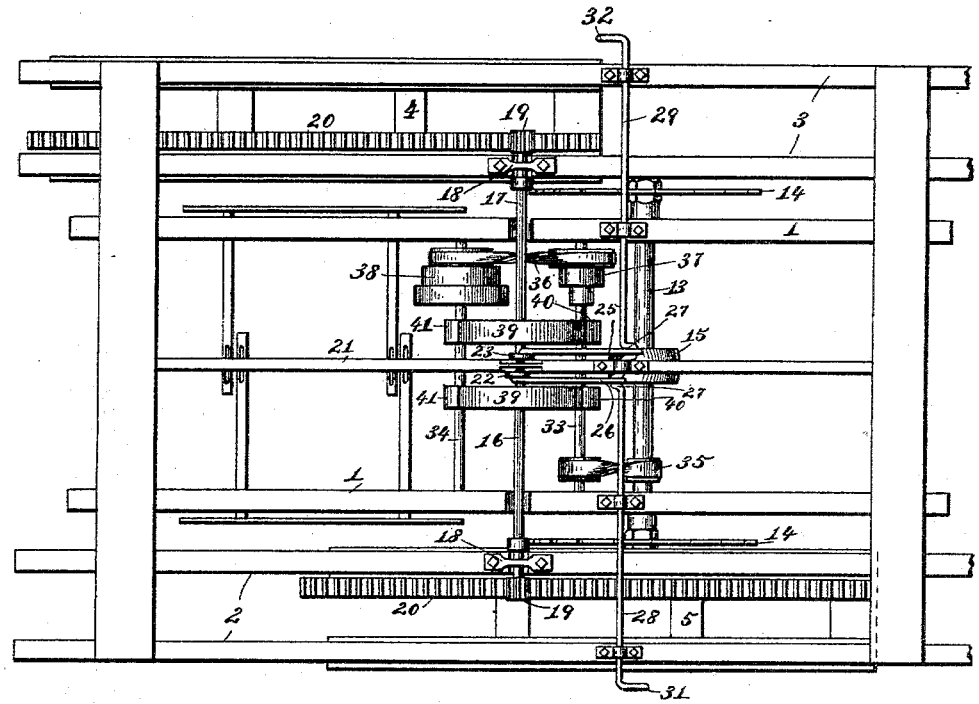
Figures 4, 5:
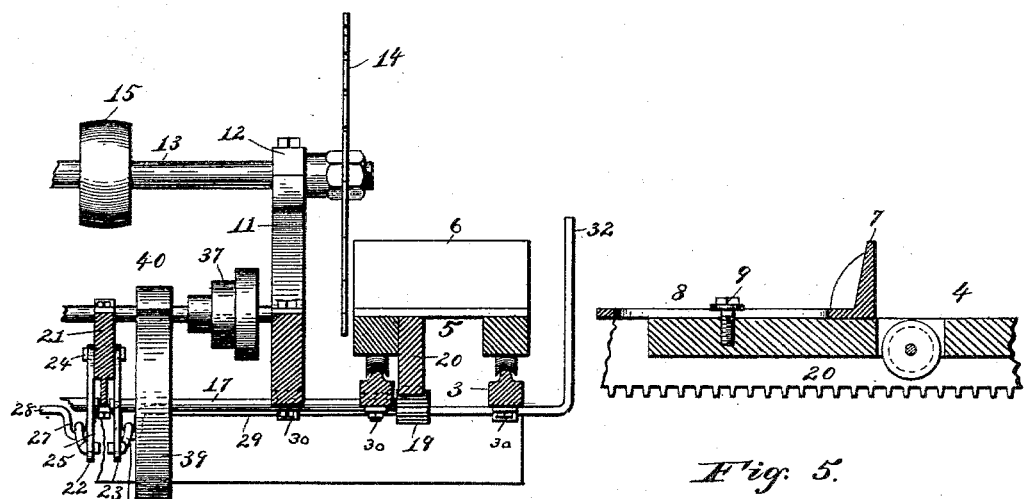

Figure 1 is a plan view. Fig. 2 is a vertical longitudinal sectional view on the plane indicated by the dotted line $x$ $x$ of Fig. 1. Figs. 3 and 4 are detail views of the feed mechanism. Fig. 5 is a detail view, partly in section, of a part of one of the carriages.

Like numerals of reference denote corresponding parts in all the figures of the drawings, referring to which—

1 designates the main frame of our improved saw-mill, and 2 3 the tracks on which run the independent carriages 4 5. These tracks are located on opposite sides of the main longitudinal frame, and they are of the ordinary or any preferred construction. The carriages are each provided with rollers or supporting-wheels in their side bars, and at one end each carriage has a vertical fixed rest 6 and the other end a movable rest 7, which is capable of an adjustment longitudinally of the carriage toward or from the fixed rest, in order to accommodate logs or work of different length and hold the same in a fixed or stationary position on the carriage. The adjustable rest is provided with horizontal slotted arms 8, through which are passed binding-screws 9, that work in suitable threaded bearings in the carriage to securely hold the adjustable rest in a fixed position thereon.

To the sides of the longitudinal main frame, at or near the middle thereof, are secured upright metallic arches 10 11, preferably of the form shown more clearly in Fig. 2, and in the upper part of the arches are provided aligned bearings or boxes 12, in which is journaled a saw mandrel or arbor 13. This mandrel extends transversely across and above the main frame 1, with its ends projecting a suitable distance beyond the bearings to receive the saws 14, one of which is rigidly fixed to each end of the mandrel and arranged over one of the carriages in such relation thereto as to properly operate on the work carried thereby. The saw-mandrel is provided at its middle, between the supporting-arches thereof, with a drive-pulley 15, over which passes a belt (not shown) that runs from an engine or motor, and this saw-mandrel in turn drives the feed mechanism, which we will now proceed to describe.

16 17 designate the feed-shafts, which are located below the supporting-arches at one side of the vertical plane of the saw-mandrel and are arranged in line with each other transversely across the main frame 1 and the tracks on which run the carriages. Near its outer end each feed-shaft is journaled in a bearing 18 on the main frame 1, which permits the shaft to have a limited lateral or swinging play in addition to its proper rotary motion without displacement in its bearing, and at its extreme outer end each feed-shaft has a gear-pinion 19, that meshes with a rack 20, fixed longitudinally to the under side of one of the carriages.

Between the inner separated ends of the feed-shafts and above the plane of said shafts is arranged a fixed longitudinal bar 21, from opposite sides of which depend rocking or swinging bearings 22 23, which are pivoted on a common pin or bolt 24, fixed in said longitudinal bar 21. Each bearing is provided at or near its middle with a transverse aperture, in which is fitted the inner extremity of one of the feed-shafts, so as to properly support the shaft to permit it to rotate therein and allow it to swing or move laterally with said bearing for a limited distance. To the lower extremities of the swinging or oscillating bearings 22 23 are connected links 25 26, which extend longitudinally of the frame 1 a short distance and are connected to short cranks 27 on the inner ends of rock-shafts 28 29, which are journaled in suitable bearings 30 on the main frame 1. These rock-shafts are arranged in line with each other transversely across the frame and extend at their ends beyond opposite sides of said frame, at which points they are provided with shifting-levers 31 32, which are arranged within convenient reach of the attendants, so that either or both feed-shafts can be operated at will.

On opposite sides of the feed-shafts 16 17 are arranged rotary shafts 33 34, for driving the feed-shafts either separately or jointly and in either direction, according to the shaft that the feed-shaft engages with. One of these shafts 33 of the feed mechanism is driven from the rotary saw-mandrel by means of a belt 35, which passes around suitable pulleys on said mandrel and shaft, and the shafts 33 34 of the feed mechanism are geared together and driven or rotated in opposite directions by means of a crossed belt 36, which passes over cone-pulleys 37 and 38, fixed, respectively, to said shafts 33 34.

Each feed-shaft is further provided at its inner end, at one side of the swinging bearing thereof, with a friction-disk 39, and the oppositely-rotary shafts 33 34 are also provided with similar friction-disks 40 41, which are arranged in line with the friction-disks 39, so that when either of the feed-shafts is adjusted either toward the shaft 33 or 34 the friction-disk 39 thereon will impinge against the friction-disk 40 or 41 of the shafts 33 or 34, according to which shaft the feed-shaft is moved against.

The operation of our saw-mill is as follows: The log is properly placed on the carriage 2 and secured thereto by the adjustable rest, after which the shifting-lever of the rock-shaft 28 is turned by the attendant to swing the proper feed-shaft 16 toward the shaft 33, so that its friction-disk 39 will impinge against the disk 40 on said shaft 33 and thereby rotate the feed-shaft and move or feed the carriage 4 and the work thereon to the saw. To reverse the movement of the carriage 4, the shifting-lever is turned in the opposite direction to move the feed-shaft out of contact with the shaft 33 and into contact with the friction-disk 41 of the shaft 34 of the feed mechanism, so that the feed-shaft 16 is driven in the reverse direction and moves the carriage to the rear. The other carriage 5 of the saw-mill is operated either backward or forward in precisely the same manner from the same feed mechanism, and it is obvious that either or both of the carriages can be operated in either direction at one time or separately at will, thus allowing one carriage to remain at rest while the other is at work, or to use both carriages simultaneously.

As shown herein, the saws are arranged above the carriages to secure an overcut on the work; but it is evident that they may be arranged below the carriages without departing from the spirit of our invention.

If preferred, the saw-mill may be mounted on a suitable truck; but we have not deemed it necessary to illustrate this adaptation of our invention.

We do not restrict ourselves to the precise details of construction and form and proportion of parts herein shown and described as an embodiment of our invention, but hold ourselves at liberty to make such changes and alterations therein as fairly fall within the scope of our invention.

Having thus fully described our invention, what we claim as new, and desire to secure by Letters Patent, is—

1. In a saw-mill, the combination of a rotary saw-mandrel carrying two saws, two independent carriages arranged to travel in lines at right angles to the axis of said mandrel and at opposite ends thereof, and independent feed-shafts geared to said carriages and rotated in either direction at will from a common feed mechanism, arranged and combined for service substantially as herein shown and described.

2. In a saw-mill, the combination of a rotary mandrel carrying a saw at each end thereof and two independent carriages arranged at opposite ends of said mandrel in such relation to the saws thereof as to permit the latter to act on the work on the carriage, substantially as described.

3. In a saw-mill, the combination of a rotary mandrel carrying two saws, the carriages, the independent feed-shafts geared to said carriages, and a common feed mechanism driven from the saw-mandrel and adapted to rotate either or both of the shafts in the same or reverse directions at will, substantially as and for the purpose described.

4. In a saw-mill, the combination of a rotary mandrel carrying two saws, the carriages, the independent feed-shafts geared to the carriages and separately mounted in oscillating bearings, a shifting-lever connected to each feed-shaft, and a common feeding mechanism driven from the saw-mandrel and adapted to contact with and rotate either or both of said feed-shafts, according to the adjustment of said feed-shafts, substantially as described.

5. In a saw-mill, the combination of a rotary mandrel carrying two saws, the carriages, the independent feed-shafts geared to said carriages and separately supported in swinging bearings, a shifting-lever connected to each feed-shaft, and a pair of oppositely-rotating shafts located on opposite sides of the feed-shafts and geared to each other and the saw-mandrel, said oppositely-rotating shafts being provided with friction-disks 40 41, against which are adapted to alternately impinge the friction-disk 39 on either of said feed-shafts, according to the adjustment thereof, all arranged and combined for service substantially as and for the purpose described.

In testimony whereof we affix our signatures in presence of two witnesses.

JOHN C. LAKE.
BERTUS A. LAKE.

Witnesses:
ELLA SCOTT,
JOHN B. ODELL.